(12) United States Patent
McDaniel et al.

(10) Patent No.: US 11,698,599 B2
(45) Date of Patent: Jul. 11, 2023

(54) COUPLING STRUCTURE FOR A DEVELOPING ROLLER OF AN IMAGE FORMING APPARATUS

(71) Applicant: HEWLETT-PACKARD DEVELOPMENT COMPANY, L.P., Spring, TX (US)

(72) Inventors: Gabriel S. McDaniel, Boise, ID (US); Justin Pettingill, Boise, ID (US); Jeffrey H. Luke, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/792,179

(22) PCT Filed: Apr. 24, 2020

(86) PCT No.: PCT/US2020/029711
§ 371 (c)(1),
(2) Date: Jul. 12, 2022

(87) PCT Pub. No.: WO2021/216080
PCT Pub. Date: Oct. 28, 2021

(65) Prior Publication Data
US 2023/0077968 A1 Mar. 16, 2023

(51) Int. Cl.
*G03G 21/16* (2006.01)
*F16D 1/00* (2006.01)
(Continued)

(52) U.S. Cl.
CPC ........... *G03G 21/1647* (2013.01); *F16D 1/00* (2013.01); *F16D 7/00* (2013.01); *G03G 15/0808* (2013.01); *G03G 21/186* (2013.01)

(58) Field of Classification Search
CPC ........... G03G 15/0808; G03G 21/1647; G03G 21/1676; G03G 21/1857; G03G 21/186; F16D 1/00; F16D 7/00; F16D 7/02
See application file for complete search history.

(56) References Cited

U.S. PATENT DOCUMENTS 5,126,800 A 6/1992 Shishido et al.
5,669,046 A 9/1997 Yoshida et al.
(Continued)

FOREIGN PATENT DOCUMENTS

CN 110632836 A 12/2019
CN 210005862 U 1/2020
(Continued)

*Primary Examiner* — Sophia S Chen
(74) *Attorney, Agent, or Firm* — Foley & Lardner LLP

(57) ABSTRACT

An image forming apparatus includes a development cartridge having a developing roller. The developing roller includes a roller body, and a shaft to pass through a central axis of the roller body. A coupling structure is disposed at an end part of the shaft, is movable from a first position to a second position, and includes a first coupling piece and a second coupling piece. Positions of the first coupling piece and the second coupling piece are maintained with respect to one another by a static frictional force between surfaces of the first coupling piece and the second coupling piece to hold the coupling structure in the first position. When a predetermined force overcomes the static frictional force, the first coupling piece and the second coupling piece disengage from one another to allow the coupling structure to move from the first position to the second position.

15 Claims, 10 Drawing Sheets

(51) Int. Cl.
*G03G 15/08* (2006.01)
*G03G 21/18* (2006.01)
*F16D 7/00* (2006.01)

(56) References Cited

U.S. PATENT DOCUMENTS

| | | |
|---|---|---|
| 6,725,004 B2 | 4/2004 | Ahn et al. |
| 6,768,890 B2 | 7/2004 | Cho et al. |
| 8,995,881 B2 | 3/2015 | Kawai |
| 9,436,156 B1 | 9/2016 | Hattori et al. |
| 2019/0250540 A1* | 8/2019 | Tomita |

FOREIGN PATENT DOCUMENTS

| | | |
|---|---|---|
| JP | H09-177807 A | 7/1997 |
| JP | 2004-85593 A | 3/2004 |
| JP | 2009-288325 A | 12/2009 |
| WO | WO-2019/242485 A1 | 12/2019 |

\* cited by examiner

COUPLING STRUCTURE FOR A DEVELOPING ROLLER OF AN IMAGE FORMING APPARATUS

BACKGROUND

An image forming apparatus forms an image on a recording medium, for example, in an electrophotographic manner. An image forming apparatus using the electrophotographic method supplies toner to an electrostatic latent image formed on a photoconductor to form a visible toner image on the photoconductor, transfers the toner image to the recording medium via an intermediate transfer medium or directly to a recording medium, and then fixes the transferred toner image on the recording medium.

A development system may include a development cartridge capable of being detachably attached to the image forming apparatus. The development cartridge may include an assembly of elements including a photoconductor and a developing roller for forming the visible toner image. The development cartridge may be detachably attached to a main body of the image forming apparatus and be a consumable item that is replaced when its service life is over. In a development cartridge using a contact development method, a developing roller and a photoconductor contact each other, thereby forming a development nip.

DETAILED DESCRIPTION

Figure 1:
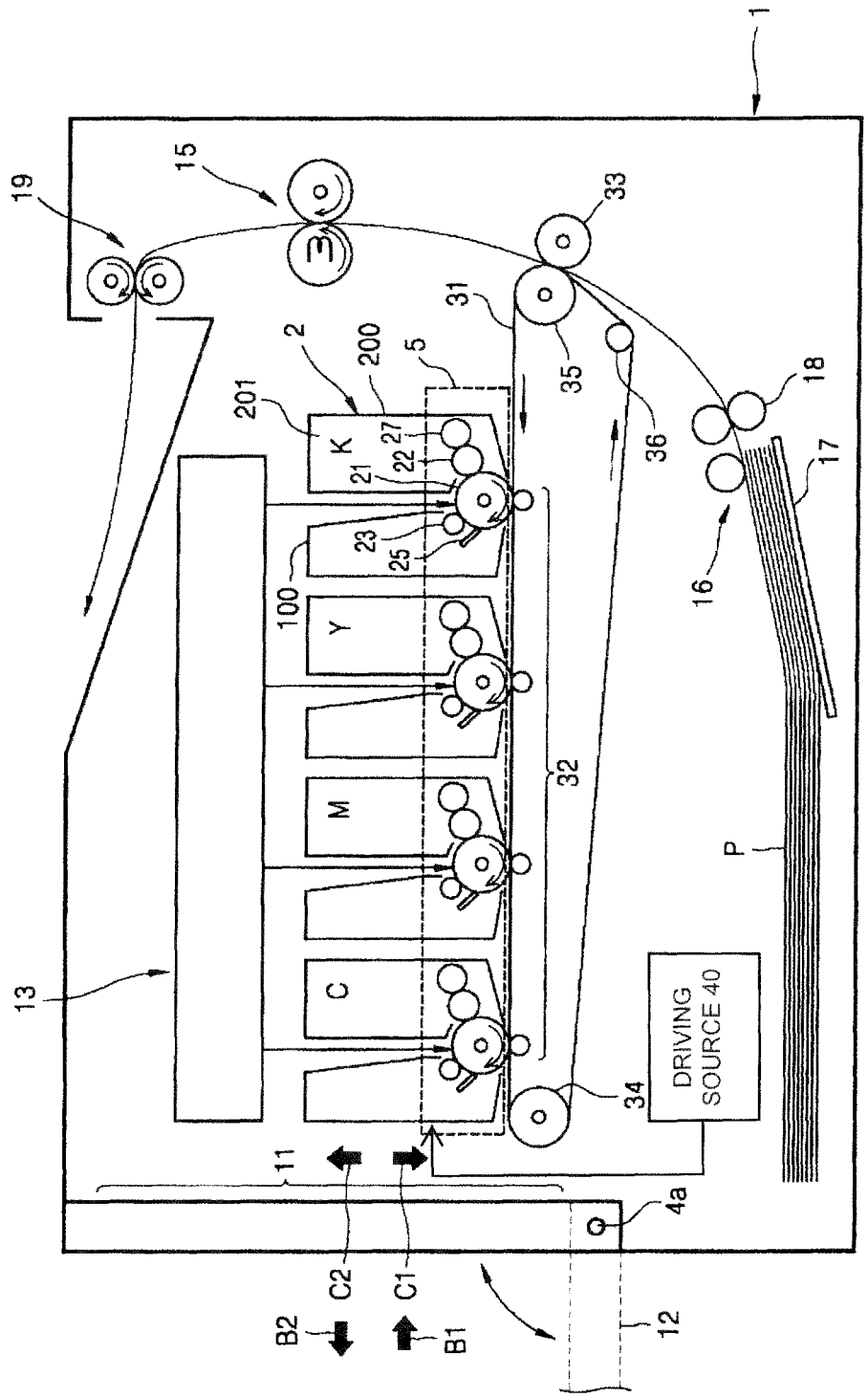
FIG. 1 is a schematic configuration diagram illustrating an image forming apparatus according to an example.

Hereinafter, examples of an electrophotographic image forming apparatus and a development system having a development cartridge will be described in detail with reference to the accompanying drawings. Elements having substantially the same configurations are denoted by the same reference numerals in the specification and the accompanying drawings, and thus, a repeated description thereof is omitted.

According to the disclosure, a development system (development cartridge) includes a photosensitive unit including a photosensitive drum, and a developing unit including a developing roller. The developing unit may be coupled to the photosensitive unit such that the developing unit is movable to a development position where a development nip forms by contact between the developing roller and the photosensitive drum and is movable to a release position where the development nip is released.

According to the disclosure, the developing roller includes a roller body, and a shaft to pass through a central axis of the roller body, where an end part of the shaft includes a coupling structure movable from a first position to a second position. The coupling structure couples the developing roller to a body within a print engine of the image forming apparatus and includes coupling pieces connected to one another, for example a first coupling piece, and a second coupling piece connected to the first coupling piece.

Positions of the first coupling piece and the second coupling piece may be maintained with respect to one another by a static frictional force between surfaces of the first coupling piece and the second coupling piece so as to hold the coupling structure in the first position. For example, when the development cartridge is inserted into the image forming apparatus positions of the first coupling piece and the second coupling piece may be maintained with respect to one another by the static frictional force. When a predetermined force sufficient to overcome the static frictional force is applied to the coupling structure, for example, by rotation of the development cartridge itself or by rotation of the developing unit or developing roller, the first coupling piece and the second coupling piece disengage from one another to allow the coupling structure to move from the first position to the second position.

In many development cartridges, for example an all-in-one development cartridge which includes a developing roller, photoconductor, and toner, there are applications where the developing roller may be positioned in one of two states: an alienated state and a non-alienated state. The alienated state of the development roller may be a state in which the developing roller is spaced apart from the photoconductor. The non-alienated state of the development roller may be a state in which the developing roller is brought into contact with the photoconductor.

Applications in which the developing roller may be positioned in the alienated state include when an image forming operation, such as a printing operation, is not performed. For example, the developing roller may be positioned in the alienated state so that the developing roller is not rotated even though the photoconductor or another component may be rotated. Thus, placing a developing roller in the alienated state may reduce wear and extend the life of the developing roller, minimize the impact on the environment through waste reduction, provide power savings, and increase customer satisfaction. Applications in which the developing roller may be placed in the non-alienated state include when an image forming operation is to be performed.

Whether the developing roller is placed in the alienated or non-alienated state may be controlled by the image forming apparatus, for example by a controller of the image forming apparatus. For example, the controller of the image forming apparatus may transmit a drive signal to a driving source to cause the developing roller to be rotated or translated based on mechanical movements imposed on the developing roller and/or the photoconductor.

The alienation movements imparted by the image forming apparatus to the development cartridge can cause power transmitting issues where a shaft of the developing roller that aligns in the alienation state is misaligned. The example coupling structures described herein can maintain reliable power transmission in a coaxial drive state or a non-coaxial drive state of the developing roller such that power to perform developer cartridge functions is maintained in both the alienated and non-alienated states.

The example coupling structures described herein allow a developing roller of a development cartridge to be properly installed in the image forming apparatus by aligning the coupling structure of the developing roller to the print engine coupling upon insertion. For example, a rotatable shaft of the developing roller may include the coupling structure and may be used to transmit power in both coaxial and non-coaxial configurations. The proper alignment of the coupling structure of the developing roller may be achieved by intrinsic features incorporated into the coupling structure that work to temporarily hold the coupling in an orientation that is aligned for insertion of the developing roller into the image forming apparatus. The alignment may be set during manufacture or by an end user to prepare the coupling alignment prior to insertion of the developing roller into the print engine.

As described above a development cartridge may be configured to pivot between two positions during operation. This changes the position of the cartridge rollers and a mechanism may be used to maintain coupling when the printer drive and the cartridge rollers are not aligned.

For example, a mechanism may include an urging member to urge the coupling in a specified direction. However, in examples described herein, an urging member may not be used or needed to maintain a position or alignment of the coupling structure.

Before installing the development cartridge in the image forming apparatus, a user may manually align or set the coupling structure, which is disposed at an end part of the developing roller shaft, so that the coupling structure may engage with the drive system of the print engine when the development cartridge is installed or mounted to the image forming apparatus.

An example coupling structure described herein employs coupling pieces (or coupling components, members, or parts) which have surfaces having enough static friction to hold the coupling pieces in alignment when subjected to minimal forces during handling of the development cartridge. When the coupling pieces are subjected to a higher force, the coupling pieces are disengaged from one another and relative movement of the coupling pieces is permitted or allowed. For example, a sufficient force to overcome the static friction may occur after the development cartridge is installed or inserted into the image forming apparatus and subjected to a pivoting action, for example to move the developing unit or developing roller from a non-alienated state to an alienated state, or vice versa.

Another example coupling structure described herein employs bumps (or protrusions) and slots (or recesses) to hold the coupling pieces in a state of alignment when subjected to minimal forces during handling of the development cartridge. When the coupling pieces are subjected to a higher force, the coupling pieces are disengaged from one another and relative movement of the coupling pieces is permitted or allowed. For example, a sufficient force to overcome an interference fit between the bumps and slots may occur after the development cartridge is installed or inserted into the image forming apparatus and subjected to a pivoting action, for example to move the developing unit or developing roller from a non-alienated state to an alienated state, or vice versa.

Another example coupling structure described herein employs a sleeve which circumferentially surrounds the coupling pieces to hold the coupling pieces in a state of alignment when subjected to minimal forces during handling of the development cartridge. When the coupling pieces are subjected to a larger force, the coupling pieces are disengaged from one another and relative movement of the coupling pieces is permitted or allowed. For example, a sufficient force to overcome the holding force of the sleeve may occur after the development cartridge is installed or inserted into the image forming apparatus and subjected to a pivoting action, for example to move the developing unit or developing roller from a non-alienated state to an alienated state, or vice versa. The sleeve may tear at predetermined portions so that the coupling pieces are disengaged from one another and relative movement of the coupling pieces is permitted or allowed. The sleeve may also be flexible so that the coupling pieces are disengaged from one another and relative movement of the coupling pieces is permitted or allowed.

Features of the above example coupling structures may be employed independently or in combination with one another. For example, the coupling pieces may have surfaces having a predetermined coefficient of friction and bumps and slots, and a sleeve may circumferentially surround the coupling pieces.

According to the disclosure, an image forming apparatus may include a main body, and a development cartridge having the developing roller with a coupling structure. The development cartridge may be installable to the main body and detachable from the main body.

FIG. 1 is a schematic configuration diagram illustrating an electrophotographic image forming apparatus, according to an example. An image forming apparatus according to the example prints a color image to a recording medium P in an electrophotographic manner. Referring to FIG. 1, the image forming apparatus may include a main body 1, a plurality of development cartridges 2, an exposure device 13, a transfer device, and a fuser 15.

For color printing, the plurality of development cartridges 2 may include four development cartridges 2 for developing images with cyan color, magenta color, yellow color, and black color, respectively. Toners, of cyan (C) color, magenta (M) color, yellow (Y) color, and black (K) color may be contained in the four development cartridges 2, respectively. Although not illustrated, the toners of cyan color, magenta color, yellow color, and black color may be respectively contained in four toner supply containers, and may be respectively supplied from the four toner supply containers to the four development cartridges 2. The image forming apparatus may further include development cartridges 2 for containing and developing toners of other various colors such as light magenta color and white color. Hereinafter, unless there is a particular description contrary thereto, items with reference characters C, M, Y, and K indicate elements for developing images with cyan color, magenta color, yellow color, and black color, respectively.

The main body 1 includes an opening 11 that provides a path for mounting/detaching the plurality of development cartridges 2. A cover or door 12 opens and closes the opening 11. The cover or door 12 may rotate about a hinge 4a, for example, to open and close the opening 11. The opening may be located on a side of the main body 1, for example, a front, rear, left, or right side. The exposure device 13, the transfer device, and the fuser 15 are arranged at the main body 1. In addition, a recording medium transport unit for loading and transporting the recording medium P where an image is to be formed is arranged at the main body 1.

In the example, each of the plurality of development cartridges 2 is an integrated development cartridge. Each development cartridge 2 may include a photosensitive unit 100 and a developing unit 200.

The photosensitive unit 100 includes a photosensitive drum 21. The photosensitive drum 21, as a photoconductor or organic photoconductor on which an electrostatic latent image is formed, may include a conductive metal pipe and a photosensitive layer formed at an outer circumference of the conductive metal pipe. A charging roller 23 is an example of a charger that charges a surface of the photosensitive drum 21 to have a uniform surface potential. Instead of the charging roller 23, a charging brush, a corona charger, or the like may be used. The photosensitive unit 100 may further include a cleaning roller for removing foreign substances attached to a surface of the charging roller 23. A cleaning blade 25 is an example of a cleaning member that removes residual toners and foreign substances attached to the surface of the photosensitive drum 21 after a transfer process described below. Instead of the cleaning blade 25, a cleaning device in another form, such as a rotating brush, may be used.

The developing unit 200 includes a toner container 201. The developing unit 200 supplies a toner in the toner container 201 to an electrostatic latent image formed on the photosensitive drum 21, thereby developing the electrostatic latent image into a visible toner image. A developing method may include a one-component developing method using a toner and a two-component developing method using a toner and a carrier. In an example, the developing unit 200 employs the one-component developing method. A developing roller 22 supplies a toner to the photosensitive drum 21. A developing bias voltage may be applied to the developing roller 22 to supply the toner to the photosensitive drum 21.

The one-component developing method may be classified into a contact development technique in which the developing roller 22 and the photosensitive drum 21 rotate while contacting each other and a non-contact development technique in which the developing roller 22 and the photosensitive drum 21 rotate while being separate from each other by tens to hundreds of microns. In an example, a contact development technique in which the developing roller 22 and the photosensitive drum 21 contact each other and thus form a development nip N is used. A supply roller 27 supplies the toner in the toner container 201 to a surface of the developing roller 22. To this end, a supply bias voltage may be applied to the supply roller 27. The developing unit 20 may further include a regulating member (not shown) for regulating an amount of toner to be supplied by the developing roller 22 to the development nip N where the photosensitive drum 21 and the developing roller 22 contact each other. For example, the regulating member may be a doctor blade that elastically contacts the surface of the developing roller 22.

The exposure device 13 radiates light modulated in correspondence with image information onto the photosensitive drum 21 and thus forms the electrostatic latent image on the photosensitive drum 21. Examples of the exposure device 13 may include a laser scanning unit (LSU) using a laser diode as a light source and a light-emitting diode (LED) exposure device using an LED as a light source.

The transfer device may include an intermediate transfer belt 31, first transfer rollers 32, and a second transfer roller 33. The intermediate transfer belt 31 temporarily receives a toner image developed on the photosensitive drum 21 of each of the development cartridges 2C, 2M, 2Y, and 2K. The intermediate transfer belt 31 is circulated while being supported by supporting rollers 34, 35, and 36. Four first transfer rollers 32 are positioned to face the photosensitive drums 21 of the development cartridges 2C, 2M, 2Y, and 2K with the intermediate transfer belt 31 therebetween. A first transfer bias voltage is applied to the four first transfer rollers 32 to firstly transfer toner images, which are developed on the photosensitive drums 21, to the intermediate transfer belt 31. Instead of the first transfer rollers 32, a corona transfer device or a pin scorotron-type transfer device may be used. The second transfer roller 33 is positioned to face the intermediate transfer belt 31. A second transfer bias voltage is applied to the second transfer roller 33 to transfer, to the recording medium P, the toner images that are firstly-transferred to the intermediate transfer belt 31.

When a print command is transmitted from a host (not shown), or is input at the image forming apparatus, etc., a controller of the image forming apparatus charges, by using the charging roller 23, the surface of the photosensitive drum 21 to have a uniform surface potential. The exposure device 13 forms electrostatic latent images on the photosensitive drums 21 by scanning four light beams to the photosensitive drums 21 of the development cartridges 2C, 2M, 2Y, and 2K, the four light beams being modulated according to image information corresponding to cyan, magenta, yellow, and black colors, respectively. The developing rollers 22 of the development cartridges 2C, 2M, 2Y, and 2K supply C, M, Y, and K toners to the photosensitive drums 21, respectively, thereby developing the electrostatic latent images into visible toner images. The developed toner images are firstly transferred to the intermediate transfer belt 31. Recording media P loaded on a loading plate 17 are output one by one by a pick-up roller 16, and are transported to a transfer nip by a feed roller 18, the transfer nip being formed by the second transfer roller 33 and the intermediate transfer belt 31. The toner images that are firstly-transferred to the intermediate transfer belt 31 are secondly transferred to the recording medium P due to the second transfer bias voltage applied to the second transfer roller 33. When the recording medium P passes through the fuser 15, the toner images are fixed on the recording medium P due to heat and pressure. The recording medium P on which fixing has been completed is externally discharged by a discharge roller 19.

The development cartridges 2C, 2M, 2Y, and 2K may be sequentially detachably attached to the main body 1 through the opening 11 opened by the door or cover 12. That is, the plurality of development cartridges 2 may be mounted on the main body 1 by opening the door 12 and causing the development cartridges 2 to slide in a mounting direction B1. Also, the development cartridges 2 may be detached from the main body 1 by opening the door 12 and causing the development cartridges 2 to slide in a removal direction B2.

The development cartridges 2C, 2M, 2Y, and 2K may be mounted on the main body 1 in a tray manner. The main body 1 includes a tray 5 which is loaded with the development cartridges 2C, 2M, 2Y, and 2K which can be inserted into the main body 1 and retracted from the main body 1. For example, after the door 12 is opened, and the tray 5 is brought out of the main body 1 by causing the tray 5 to slide in the removal direction B2, the development cartridges 2C, 2M, 2Y, and 2K may be loaded on the tray 5. Next, the tray 5 may be inserted into the main body 1 by causing the tray 5 to slide in the mounting direction B1, and the door 12 may be closed. When the tray 5 is inserted into the main body 1, and the door 12 is closed, the tray 5 may be moved in a descending direction C1 by a closing operation of the door 12. When the door 12 is opened, the tray 5 may be moved in an ascending direction C2.

Rotational members of the development cartridge 2, e.g., the photoconductive drum 21, the developing roller 22, and the supply roller 27, may be driven by being connected to a driving source 40 arranged at the main body 1 when the development cartridge 2 is mounted or installed to the main body 1.

The driving source 40 may be coupled directly or indirectly to a rotatable shaft to rotate a body, for example a roller of the image forming apparatus. The driving source 40 may include a motor, a solenoid, another electromechanical device, or combinations thereof. For example, the driving source 40 may include a motor, a gear coupled to a rotatable shaft, and a driving belt coupling the motor to the gear to drive rotation of the rotatable shaft according to a signal output from the controller. The rotatable shaft may be rotated in a first direction and a second direction by the driving source 40. The first direction may be referred to as a "forward" direction and the second direction may be referred to as a "reverse" direction. A driving source may drive more than one body. For example, a single driving source may cause more than one body to move or rotate. For example, the driving source 40 may drive all of the four development cartridges 2, or four driving sources 40 may be respectively arranged with respect to the four development cartridges 2.

Figure 2:
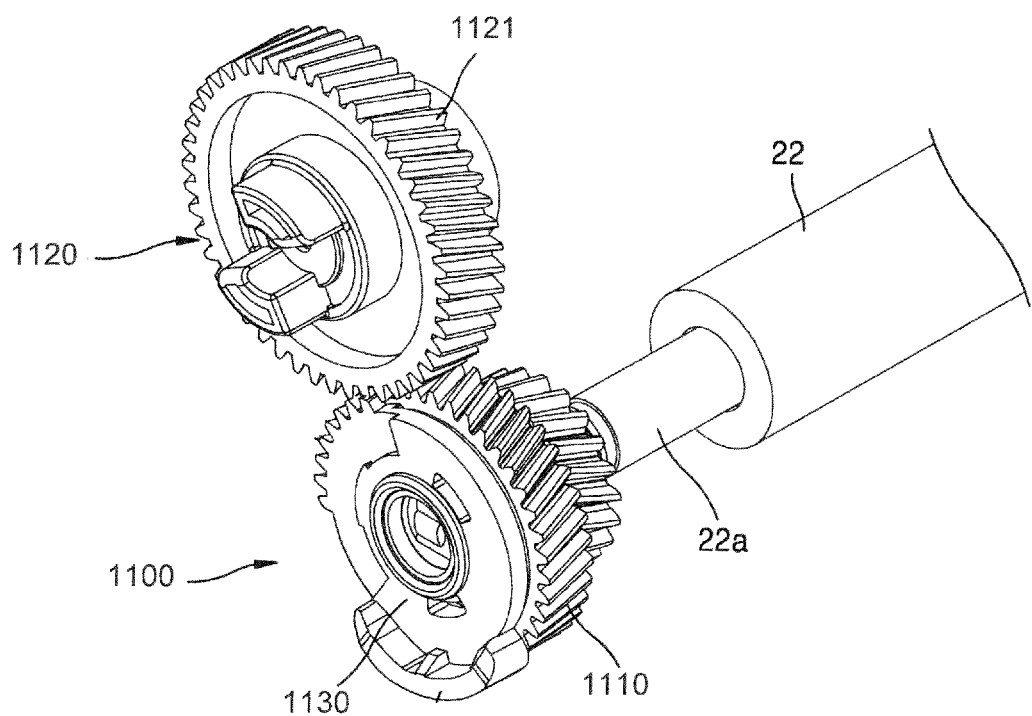
FIG. 2 is an example drive system for a print engine of an image forming apparatus, according to an example.

Referring to FIG. 2, an example drive system for a print engine of an image forming apparatus is illustrated, according to an example.

In the example drive system 1100, an end part of the shaft 22a of the developing roller 22 is connected to a driving gear 1110 which may be connected directly to a gear portion 1121 of a coupler 1120, or may be connected to the gear portion 1121 of the coupler 1120 via an idle gear (not shown). A cam member 1130 may be disposed to be coaxial with a rotation axis of the driving gear 1110. For example, the cam member 1130 may be mounted on the rotation shaft 22a of the developing roller 22 and rotate about the rotation shaft 22a of the developing roller 22, or the cam member 1130 may be mounted on a supporting shaft (not shown) of the driving gear 1110 and rotate about the supporting shaft extending from the driving gear 1110.

When the driving source 40, for example a driving motor, arranged at the main body 1 rotates, for example in a forward direction, the coupler 1120 may rotate in a first direction, and the driving gear 1110 may rotate in a second direction. When the driving source 40, for example a driving motor, arranged at the main body 1 rotates, for example in a reverse direction, the coupler 1120 may rotate in a second direction, and the driving gear 1110 may rotate in a first direction. Though not explicitly shown in FIG. 2, an end part of shaft 22a of the developing roller 22, for example an end of the shaft 22a itself or a gear attached to the end of the shaft, may be coupled to a coupling structure to be mounted to a receiving member or coupling member of the drive system 1100, for example driving gear 1110 that is configured to receive an end coupling piece of the coupling structure. Example coupling structures will be further described herein.

The development nip may be formed or released between the developing roller 22 and the photoconductor 21 by virtue of the rotation of the driving gear 1110. That is, rotation of the driving gear 1110 may cause the developing roller 22 to move between the alienated position and the non-alienated position.

As discussed herein, proper alignment of the coupling structure of the developing roller 22 allows for the developing roller 22 to be properly mounted or installed to the printing engine of the image forming apparatus, for example to drive system 1100 so that the developing roller 22 can be allowed to move between the alienated position and the non-alienated position according to the operation of the image forming apparatus so as to save wear on the developing roller 22 and increase a useful life of the developing roller 22.

Figure 3A:
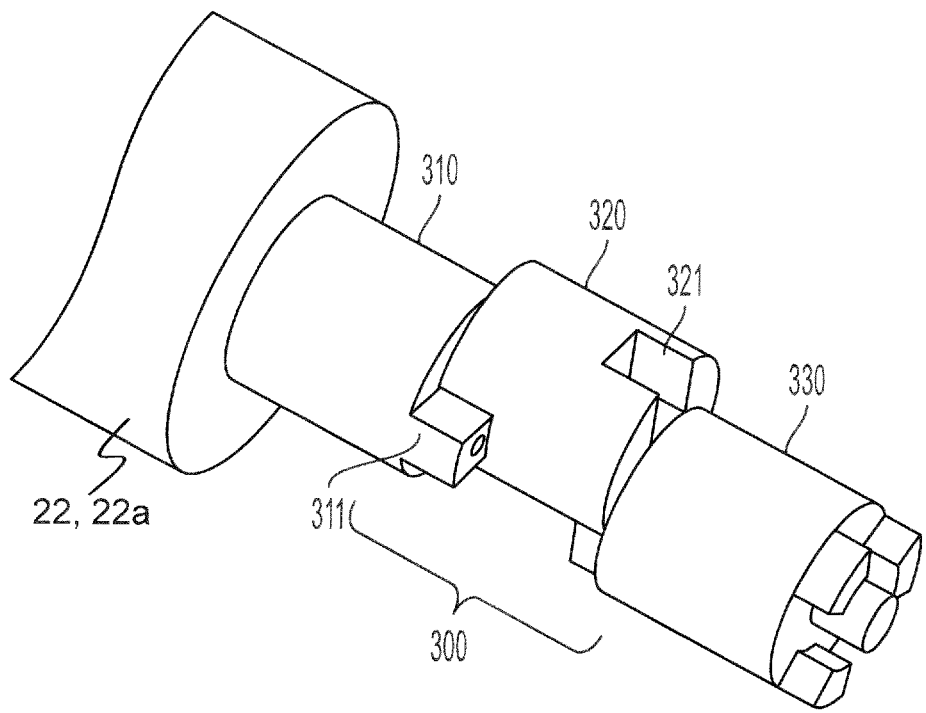
FIG. 3A is an illustration in which a coupling structure of a developing roller is misaligned for installation of an development cartridge, according to an example.
Figure 3B:
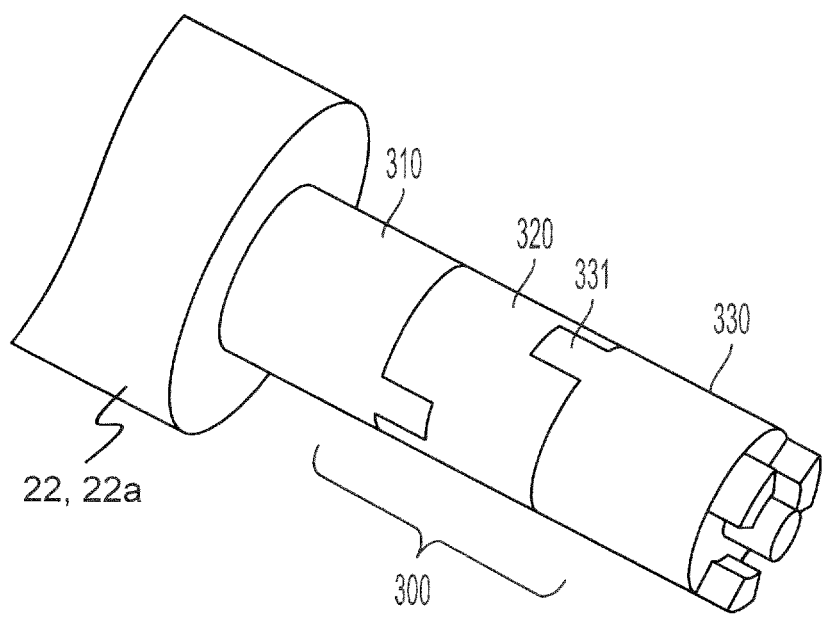
FIG. 3B is an illustration in which the coupling structure is properly aligned for installation of the development cartridge, according to an example.

Referring to FIGS. 3A and 3B, an end part of a shaft 22a of the developing roller 22 including a coupling structure 300 according to an example is illustrated. The end part of the shaft 22a may be an end of the shaft 22a itself or a gear attached to the end of the shaft 22a that mates or couples with a first coupling piece 310 of coupling structure 300. The coupling structure 300 is used to connect the shaft 22a of the developing roller 22 to a receiving member (e.g., a drive shaft or drive gear) of the print engine of the image forming apparatus to allow power to be transmitted to the developing roller 22 to switch the developing roller 22 between an alienated or non-alienated position. An example receiving member or drive system of an image forming apparatus is described with respect to FIG. 2, discussed above. The coupling structure 300 may include coupling pieces 310, 320, and 330. In the example coupling structure 300, a first coupling piece 310 is coupled to the shaft 22a, a third coupling piece 330 is to be coupled to the receiving member of the print engine of the image forming apparatus, and a second coupling piece 320 is disposed between the first coupling piece 310 and the third coupling piece 330. For example, the second coupling piece 320 may be joined to the first coupling piece 310 and the third coupling piece 330 in a tongue and groove manner. In FIG. 3A, a tongue 331 of the third coupling piece 330 is inserted in a groove 321 of the second coupling piece 320 while a tongue 311 of the first coupling piece 310 is inserted into another groove of the second coupling piece 320.

FIG. 3A illustrates an example in which the coupling structure 300 is misaligned for installation of the development cartridge to the image forming apparatus. FIG. 3B illustrates an example in which the coupling structure 300 is properly aligned for installation of the development cartridge to the image forming apparatus. If the coupling structure 300 is misaligned, the developing roller 22 may not be fully inserted or mounted to the receiving member of the print engine of the image forming apparatus. For example, when the development cartridge is shipped from a manufacturer, the coupling structure 300 of the development cartridge may or may not be set to an installation position. For example, a user may need to manipulate certain coupling pieces of the coupling structure 300 to set the coupling structure 300 to an installation position to properly install the development cartridge to the image forming apparatus. If the user does not align the coupling structure 300 properly, the developing roller 22 may not align properly with the receiving member of the print engine and the development cartridge may not be fully inserted.

Figure 4A:
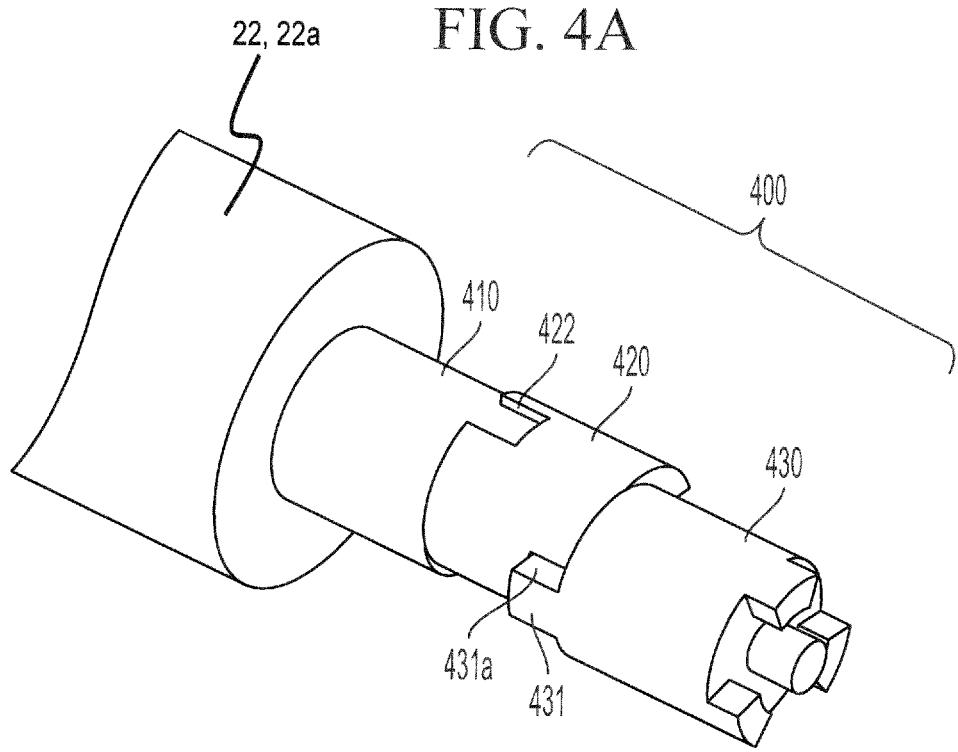
FIGS. 4A and 4B are example illustrations of a coupling structure of a developing roller, according to examples of the disclosure.
Figure 4B:
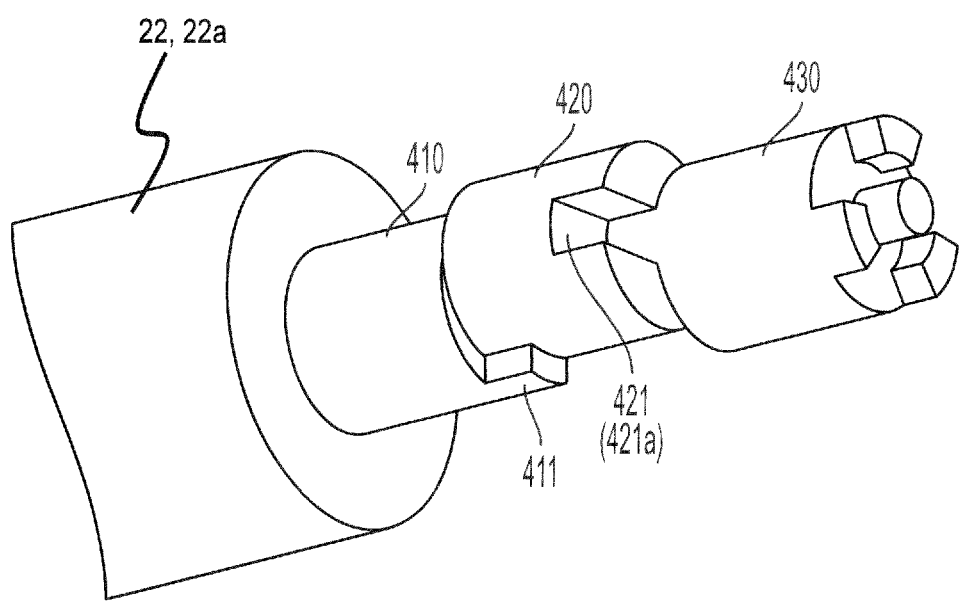

Referring to FIGS. 4A and 4B, an end part of the shaft 22a of the developing roller 22 including a coupling structure 400 according to an example is illustrated. The end part of the shaft 22a may be an end of the shaft 22a itself or a gear attached to the end of the shaft 22a that mates or couples with a first coupling piece 410 of coupling structure 400. The coupling structure 400 is used to connect the shaft 22a of the developing roller 22 to a receiving member (e.g., a drive shaft or drive gear) of the print engine of the image forming apparatus to allow power to be transmitted to the developing roller 22 to rotate or pivot the developing roller 22. The coupling structure 400 may include coupling pieces 410, 420, and 430. In the example coupling structure 400, a first coupling piece 410 is coupled to the shaft 22a, a third coupling piece 430 is to be coupled to the receiving member of the print engine of the image forming apparatus, and a second coupling piece 420 is disposed between the first coupling piece 410 and the third coupling piece 430. For example, the second coupling piece 420 may be joined to the first coupling piece 410 and the third coupling piece 430 in a tongue and groove manner. In FIG. 4A, a tongue 431 of the third coupling piece 430 is inserted in a groove 421 of the second coupling piece 420 while a tongue 411 of the first coupling piece 410 is inserted into another groove 422 of the second coupling piece 420.

According to an example, surfaces of the coupling pieces 410, 420, 430 may have intrinsic characteristics or features so that an alignment of the coupling pieces 410, 420, 430 is maintained while being subjected to minimal forces. For example, surfaces of the coupling pieces 410, 420, 430 which are joined together with one another may have intrinsic characteristics or features such as a particular coefficient of friction so that an alignment of the coupling pieces 410, 420, 430 is maintained while a user installs the development cartridge to the image forming apparatus. For example, static friction between surface 431a of tongue 431 and surface 421a of groove 421 may be provided or generated so that positions of the second coupling piece 420 and the third coupling piece 430 are maintained with respect to one another by the static frictional force between surface 421a of the second coupling piece and surface 431a of the third coupling piece 430 so as to hold the coupling structure 400 in a particular position, for example a first position. For example, the coupling structure 400 may be held in the first position which corresponds to a position of the coupling structure 400 for proper installation or mounting of the development cartridge to the image forming apparatus, where the development cartridge may be in one of an alienated or non-alienated position upon installation of the development cartridge and the shaft 22a of the developing roller 22 is properly aligned with the receiving member of the print engine when the development cartridge is installed. For example, the coupling structure 400 may be held in the first position which also corresponds to a position of the coupling structure 400 for proper removal of the development cartridge from the image forming apparatus.

When a predetermined force sufficient to overcome the static frictional force is applied to the coupling structure, the second coupling piece 420 and the third coupling piece 430 may disengage from one another to allow the coupling structure 400 to move from the first position to a second position. For example, the second position may correspond to a position of the coupling structure 400 where the development cartridge is installed or mounted in the image forming apparatus and coupling pieces 410, 420, 430 are disengaged from one another to permit or allow the development cartridge or developing roller 22 to move or pivot to the other of the alienated or non-alienated position. For example, the predetermined force may correspond to a force which is applied to the development cartridge or the developing roller 22 to pivot the development cartridge or developing roller 22 from one of the alienated or non-alienated position to the other of the alienated or non-alienated position.

Static friction between a surface of tongue 411 and a surface of groove 422 may be provided or generated so that positions of the first coupling piece 410 and the second coupling piece 420 are maintained with respect to one another by the static frictional force between the surface of the first coupling piece and the surface of the second coupling piece 420 so as to hold the coupling structure 400 in a particular position, for example the first position.

When a predetermined force sufficient to overcome the static frictional force is applied to the coupling structure, the second coupling piece 410 and the third coupling piece 420 may disengage from one another to allow the coupling structure 400 to move from the first position to the second position. For example, the predetermined force may correspond to a force which is applied to the development cartridge or the developing roller 22 to pivot the development cartridge or developing roller 22 from one of the alienated or non-alienated position to the other of the alienated or non-alienated position. An example illustration of how the coupling pieces 410, 420, 430 may be disengaged from one another is shown in FIG. 8B, noting that sleeve 840 would be omitted, and where coupling piece 430 remains in an aligned position.

The first coupling piece 410, second coupling piece 420, and/or third coupling piece 430 may be composed of materials to provide or generate a static frictional force between surfaces of the coupling pieces which maintains the alignment of the coupling structure 400 during installation of the development cartridge to the image forming apparatus, and also allows or permits the alignment of the coupling structure 400 to be broken or disengaged when subjected to the predetermined force as discussed above. For example, the surfaces of the coupling pieces which interface or contact with one another may include materials such as a thermoplastic, polyoxymethylene, acetal, nylon, zinc alloys, aluminum alloys, polytetrafluoroethylene, polyethylene (PET), ethylene tetrafluoroethylene (ETFE), or any combination thereof.

In addition to friction, the elasticity of the material and/or geometry of the coupling pieces with respect to one another, can assist in maintaining the alignment of the coupling pieces. Thus, a force which maintains the alignment of the coupling pieces may be a function of geometry, elasticity of the material, and the friction coefficients of the material. For example, a geometry of the locking mechanisms between the coupling pieces may provide a force to hold the coupling pieces together.

For example, an elasticity of PET may be about 400 ksi, an elasticity of acetal may be about 450 ksi, an elasticity of ETFE may be about 300 ksi, and an elasticity of nylon may be about 470 ksi.

For example, a coefficient of friction of PET may be about 0.25, a coefficient of friction of acetal may be about 0.2, a coefficient of friction of ETFE may be about 0.35, and a coefficient of friction of nylon may be about 0.28.

As another example, a lubricant may be disposed at one or more interfaces between the coupling pieces 410, 420, 430 to provide or generate the static frictional force between surfaces of the coupling pieces 410, 420, 430 to maintain the alignment of the coupling structure 400 during installation of the development cartridge to the image forming apparatus, and also to allow or permit the alignment of the coupling structure 400 to be broken or disengaged when subjected to the predetermined force as discussed above. For example, the lubricant may include grease or a gel, or any combination thereof. For example, the use of grease at an interface between coupling pieces could add shear forces at the joint in the static state and fix the joint for installation of the development cartridge to the image forming apparatus. The grease can also double as a surface lubricant when the joint is used dynamically to transmit power for the developing roller 22.

Referring to FIGS. 5 through 7B, an end part of a shaft 22a of the developing roller 22 including a coupling structure 500 is illustrated, according to an example. The end part of the shaft 22a may be an end of the shaft 22a itself or a gear attached to the end of the shaft 22a that mates or couples with a first coupling piece 510 of coupling structure 500. The coupling structure 500 may be used to connect the shaft 22a of the developing roller 22 to a receiving member (e.g., a drive shaft or drive gear) of the print engine of the image forming apparatus to allow power to be transmitted to the developing roller 22 to rotate or pivot the developing roller 22. A description of portions of the coupling structure 500 similar to the coupling structures 300 and 400 is omitted for the sake of brevity. The coupling structure 500 includes coupling pieces 510, 520, and 530. In the example coupling structure 500, a tongue 511 of the first coupling piece 510 is inserted in a groove 522 of the second coupling piece 520 while a tongue 531 of the third coupling piece 530 is inserted into another groove 521 of the second coupling piece 520.

Figure 5:
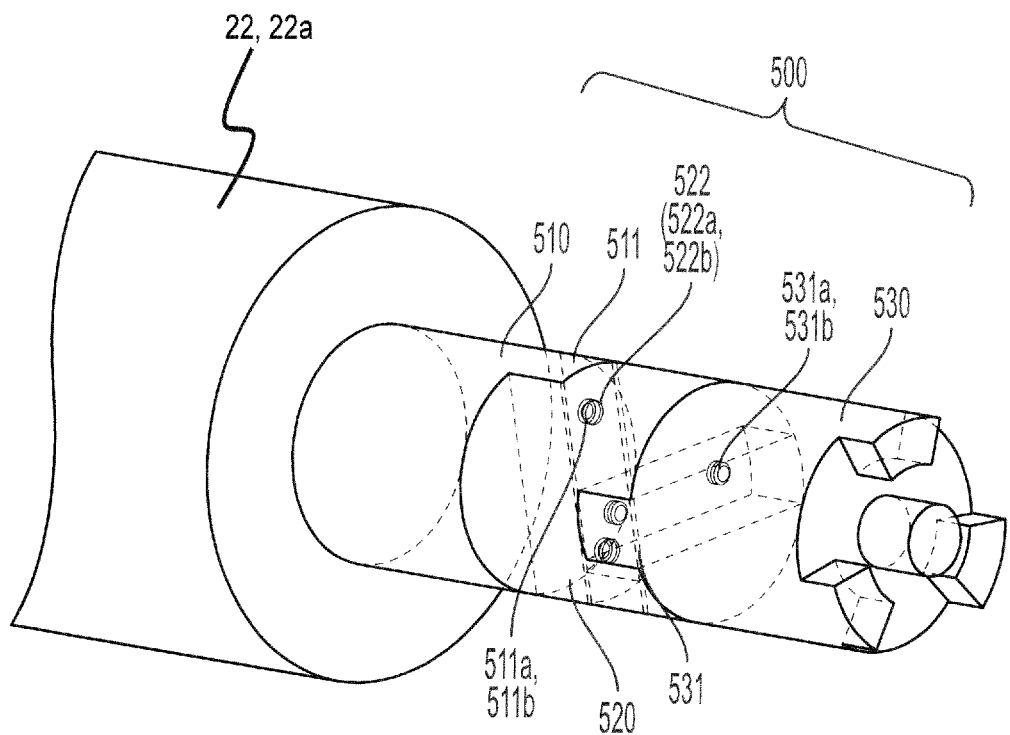
FIGS. 5 through 7B are example illustrations of a coupling structure of a developing roller, according to examples of the disclosure.
Figure 6:
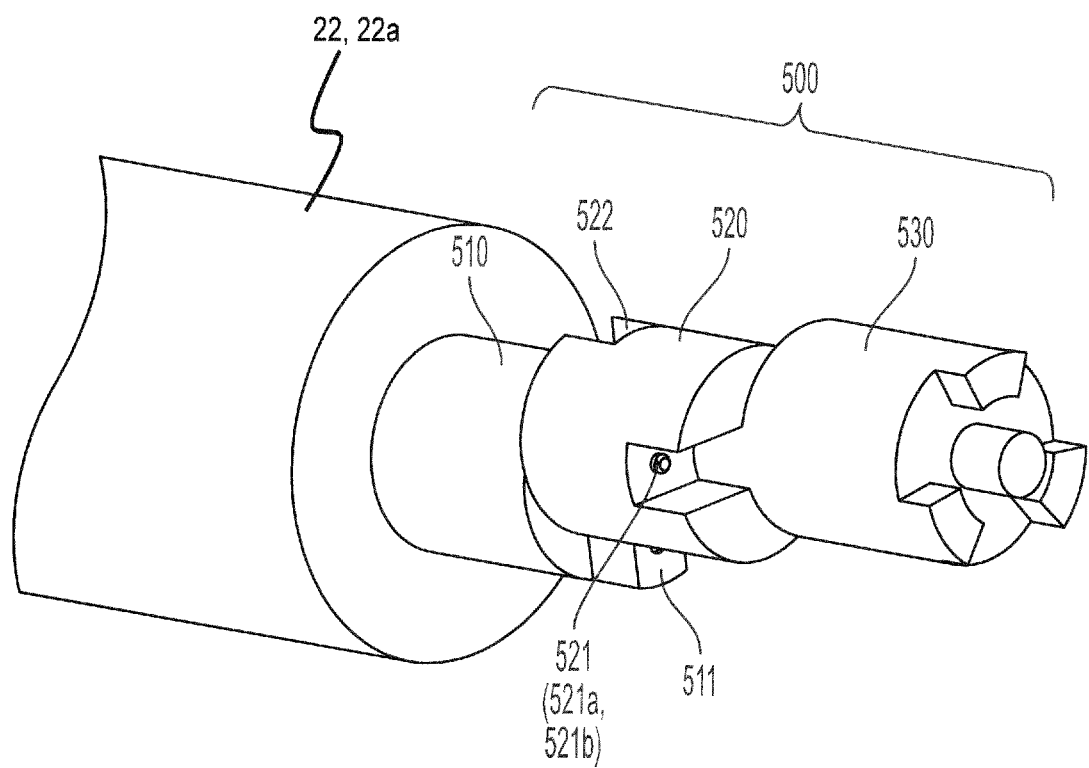

FIG. 5 illustrates an example in which coupling pieces 510, 520, 530 are axially aligned with one another and with shaft 22a of the developing roller 22. FIG. 6 illustrates an example in which the coupling pieces 510, 520, 530 are not misaligned, but are configured to be arranged in a non-coaxial manner with one another, and at least coupling pieces 520 and 530 are eccentric to a rotational axis of the shaft 22a of the developing roller 22.

According to an example, surfaces of the coupling pieces 510, 520, 530 may have protrusions and/or recesses so that an alignment of the coupling pieces 510, 520, 530 is maintained while being subjected to minimal forces. For example, surfaces of the coupling pieces 510, 520, 530 which are joined together with one another may have protrusions and/or recesses that are complementary with one another so that an alignment of the coupling pieces 510, 520, 530 is maintained while a user installs the development cartridge to the image forming apparatus.

For example, a protrusion 522b disposed on a surface 522a of groove 522 of the second coupling piece 520 may be accommodated in a recess 511b disposed on a surface 511a of tongue 511 of the first coupling piece 510 so that an interference fit is generated between the protrusion 522b and the recess 511b so that positions of the first coupling piece 510 and the second coupling piece 520 are maintained with respect to one another by the interference between the protrusion 522b and the recess 511b so as to hold the coupling structure 500 in a particular position, for example the first position. For example, the coupling structure 500 may be held in the first position which corresponds to a position of the coupling structure 500 for proper installation or mounting of the development cartridge to the image forming apparatus, where the development cartridge may be in one of an alienated or non-alienated position upon installation of the development cartridge and the shaft 22a of the developing roller 22 is properly aligned with the receiving member of the print engine when the development cartridge is installed. For example, the coupling structure 500 may be held in the first position which also corresponds to a position of the coupling structure 500 for proper removal of the development cartridge from the image forming apparatus.

Likewise, a protrusion 521b disposed on a surface 521a of groove 521 of the second coupling piece 520 may be accommodated in a recess 531b disposed on a surface 531a of tongue 531 of the third coupling piece 530 an interference fit between the protrusion 521b and the recess 531b is generated so that positions of the second coupling piece 520 and the third coupling piece 530 are maintained with respect to one another by the interference between the protrusion 521b and the recess 531b so as to hold the coupling structure 500 in a particular position, for example the first position.

When a predetermined force sufficient to overcome the interference fit is applied to the coupling structure 500, the first coupling piece 510 and the second coupling piece 520 and/or the second coupling piece 520 and the third coupling piece 530, may disengage from one another to allow the coupling structure 500 to move from the first position to a second position. For example, the second position may correspond to a position of the coupling structure 500 where the development cartridge is installed or mounted in the image forming apparatus and coupling pieces 510, 520, 530 are disengaged from one another to permit or allow the development cartridge or developing roller 22 to move or pivot to the other of the alienated or non-alienated position. For example, each of the coupling pieces 510, 520, 530 may go to a drooped position when the coupling pieces 510, 520, 530, are disengaged from one another. For example, the predetermined force may correspond to a force which is applied to the development cartridge or the developing roller 22 to pivot the development cartridge or developing roller 22 from one of the alienated or non-alienated position to the other of the alienated or non-alienated position.

Figure 7A:
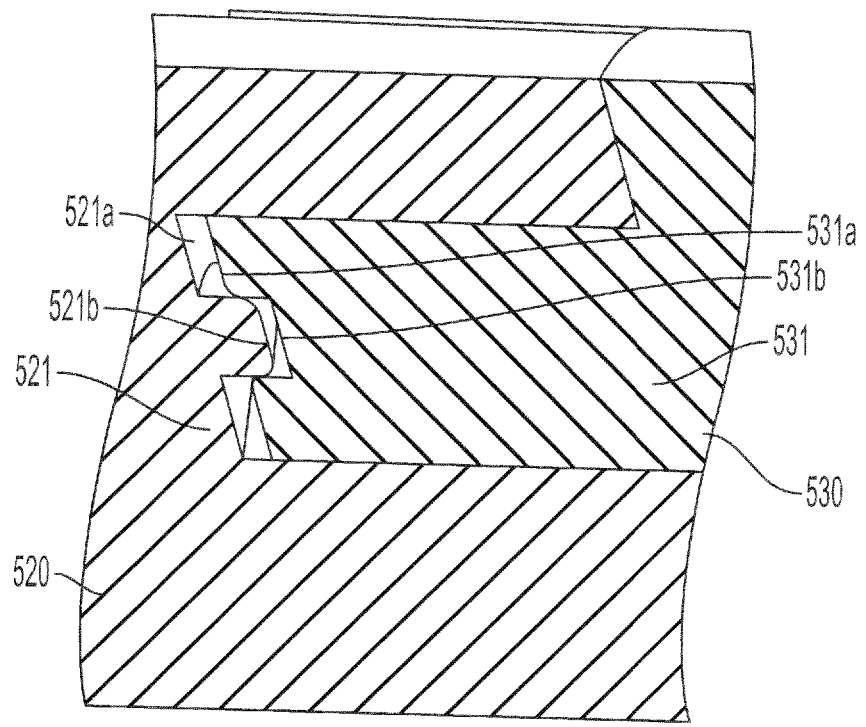
Figure 7B:
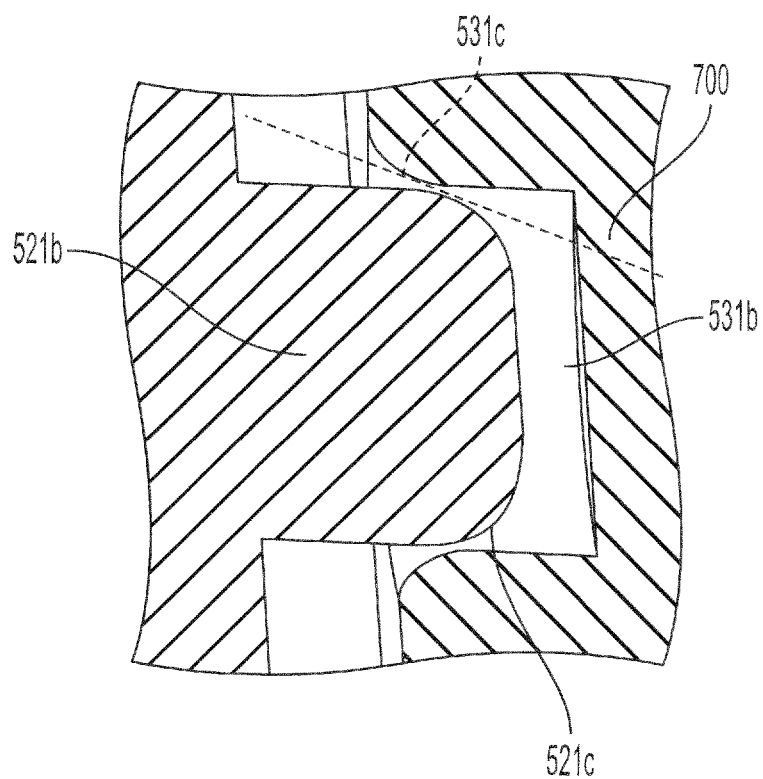

Referring to FIG. 7B, a tangent line 700 is illustrated to denote that disengagement between coupling pieces may be allowed along the tangent line 700 when a sufficient force, for example a lateral force, is applied to the coupling structure 500. For example, corners of the protrusions and corners of the recesses may be rounded to assist in the alignment being disengaged when a sufficient force is applied to the coupling structure 500. For example, in FIG. 7B, corners 531c of the recess 531b are rounded and corners 521c of the protrusion 521b are rounded.

In the example coupling structure 500 tongues 511 and 531 include two recesses. Each of grooves 521 and 522 have two protrusions which are accommodated in the corresponding recesses disposed in tongues 511 and 531. However, the disclosure is not so limited, and more than or less than two recesses and protrusions may be disposed on the surfaces of the tongues and/or grooves. As other examples, protrusions may be disposed on surfaces of the tongues and recesses may be disposed in grooves, or a combination of protrusions and recesses may be disposed on a tongue and corresponding complementary recesses and protrusions may be disposed on the groove.

A force which maintains the alignment of the coupling pieces 510, 520, 530 may be a function of the geometry or shape of the protrusions and recesses. Other shapes of the protrusion and recesses, for example polygonal shapes, may be used so long as the alignment of the coupling pieces 510, 520, 530 may be held in the first position for installation or mounting of the development cartridge to the image forming apparatus, or for removal of the development cartridge from the image forming apparatus.

Features of the coupling structure 400 and coupling structure 500 may be combined and are not mutually exclusive from one another. For example, a coupling structure may have surfaces composed of materials which have intrinsic features to provide or generate static friction between coupling pieces as discussed with respect to coupling structure 400, as well as protrusions and/or recesses as discussed with respect to coupling structure 500.

Referring to FIGS. 8A through 10, an end part of a shaft 22a of the developing roller 22 including a coupling structure 800 is illustrated, according to an example. The end part of the shaft 22a may be an end of the shaft 22a itself or a gear attached to the end of the shaft 22a that mates or couples with a first coupling piece 810 of coupling structure 800. The coupling structure 800 is used to connect the shaft 22a of the developing roller 22 to a receiving member (e.g., a drive shaft or drive gear) of the print engine of the image forming apparatus to allow power to be transmitted to the developing roller 22 to rotate or pivot the developing roller 22. A description of portions of the coupling structure 800 similar to the coupling structures 300, 400, and 500 is omitted for the sake of brevity. The coupling structure 800 includes coupling pieces 810, 820, and 830. In the example coupling structure 800, a tongue 811 of the first coupling piece 810 is inserted in a groove 822 of the second coupling piece 820 while a tongue 831 of the third coupling piece 830 is inserted into another groove 821 of the second coupling piece 820. Furthermore, a sleeve 840 circumferentially surrounds coupling pieces 810, 820, 830.

Figure 8A:
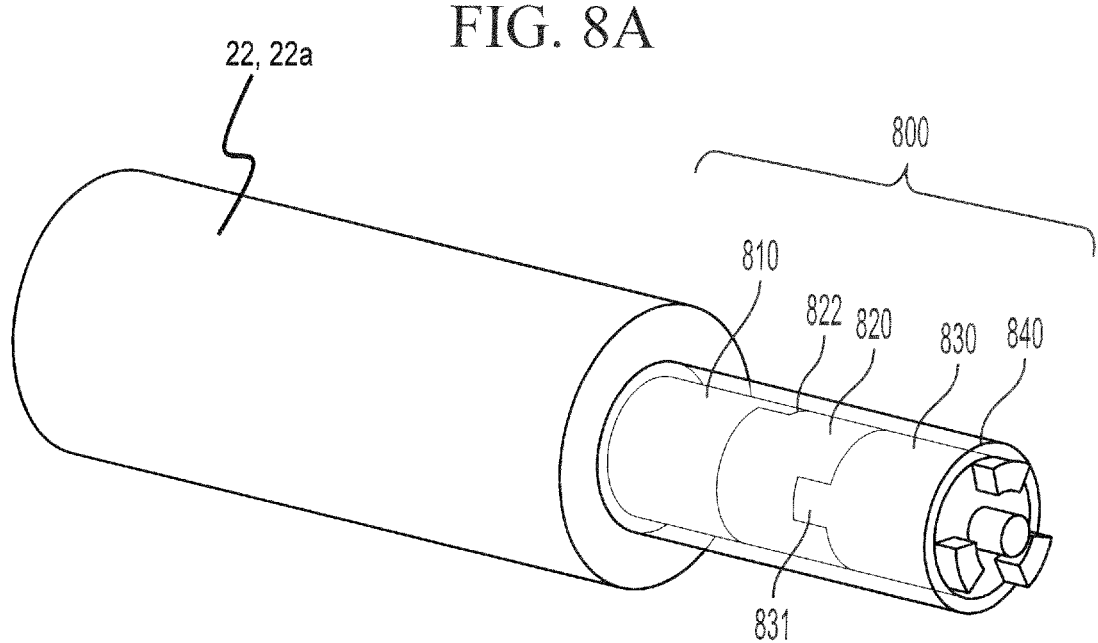
FIGS. 8A through 10 are example illustrations of a coupling structure of a developing roller, according to examples of the disclosure.
Figure 8B:
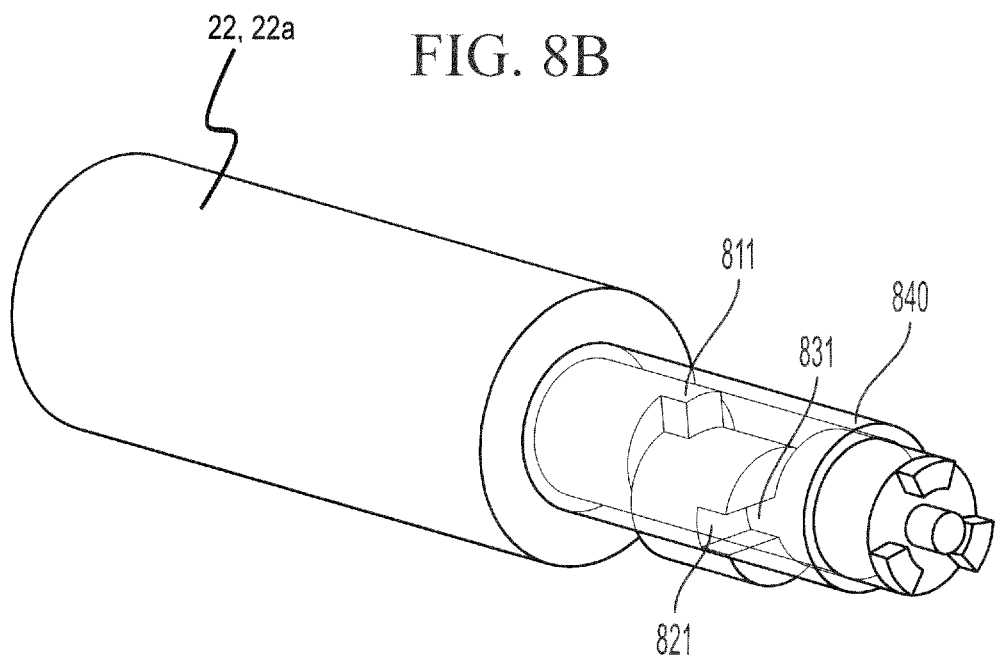
Figure 9:
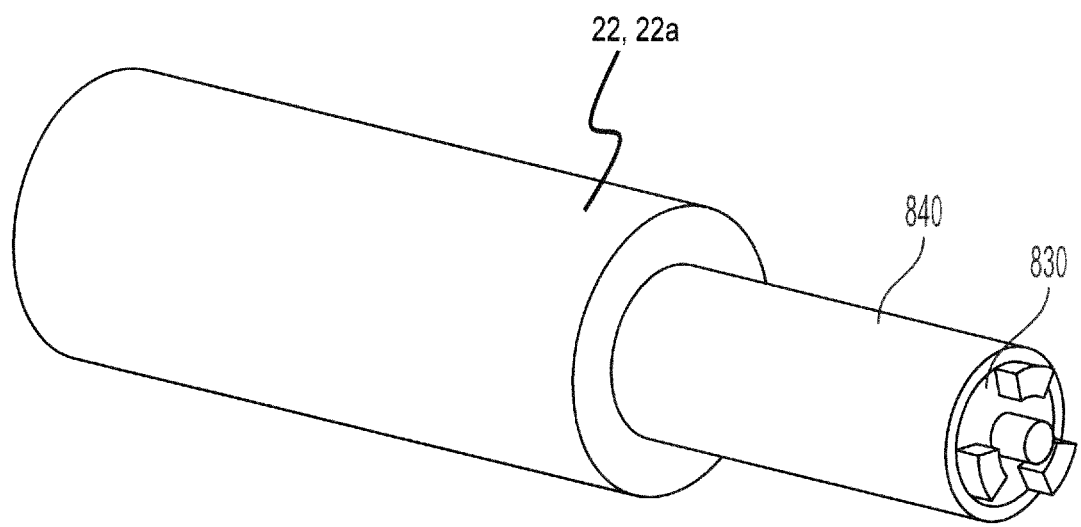

FIG. 8A illustrates an example in which coupling pieces 810, 820, 830 are axially aligned with one another and with shaft 22a of the developing roller 22, where sleeve 840 circumferentially surrounds each of coupling pieces 810, 820, 830. FIG. 8B illustrates an example in which the coupling pieces 810, 820, 830 have become disengaged from one another and are no longer coaxially arranged with respect to one another. Furthermore, portions of at least coupling pieces 820 and 830 have escaped or protrude out of sleeve 840. FIG. 9 illustrates an example of the coupling structure 800 where sleeve 840 circumferentially surrounds coupling pieces 810, 820, 830 which are not visible except an outer radial end of coupling piece 830.

According to an example, coupling pieces 810, 820, 830 are held by sleeve 840 so that an alignment of the coupling pieces 810, 820, 830 is maintained while being subjected to minimal forces. For example, sleeve 840 secures coupling pieces 810, 820, 830 so that an alignment of the coupling pieces 810, 820, 830 is maintained while a user installs the development cartridge to the image forming apparatus.

For example, a securing force may be provided or generated by the sleeve 840 so that positions of the first coupling piece 810 and the second coupling piece 820 are maintained with respect to one another by the sleeve 840 so as to hold the coupling structure 800 in a particular position, for example the first position. For example, the coupling structure 800 may be held in the first position which corresponds to a position of the coupling structure 800 for proper installation or mounting of the development cartridge to the image forming apparatus, where the development cartridge may be in one of an alienated or non-alienated position upon installation of the development cartridge and the shaft 22a of the developing roller 22 is properly aligned with the receiving member of the print engine when the development cartridge is installed. For example, the coupling structure 800 may be held in the first position which also corresponds to a position of the coupling structure 800 for proper removal of the development cartridge from the image forming apparatus.

When a predetermined force is applied to the coupling structure 800, the first coupling piece 810 and the second coupling piece 820 and/or the second coupling piece 820 and the third coupling piece 830, may disengage from one another to allow the coupling structure 800 to move from the first position to a second position. For example, the second position may correspond to a position of the coupling structure 800 where the development cartridge is installed or mounted in the image forming apparatus and coupling pieces 810, 820, 830 are disengaged from one another to permit or allow the development cartridge or developing roller 22 to move or pivot to the other of the alienated or non-alienated position. The predetermined force may be the same as or different from (greater than) the predetermined force described with respect to the coupling structures 400 and 500. For example, the predetermined force may correspond to a force which is applied to the development cartridge or the developing roller 22 to pivot the development cartridge or developing roller 22 from one of the alienated or non-alienated position to the other of the alienated or non-alienated position. For example, the magnitude of the predetermined force corresponds to a force sufficient to overcome the strength of the material of the sleeve such that the sleeve become flexible or actually tears.

The sleeve 840 circumferentially surrounds the coupling structure 800 to maintain the positions of the first coupling piece 810, the second coupling piece 820, and the third coupling piece 830 with respect to one another such that the coupling structure 840 is held in the first position. For example, when a predetermined force is applied to the coupling structure 830, the sleeve is to allow the first coupling piece 810 and the second coupling piece 820 and/or the second coupling piece 820 and the third coupling piece 830, to disengage from one another to allow the coupling structure 800 to move from the first position to the second position.

Referring to FIG. 8B, the sleeve 840 may be composed of a material which may be punctured by a coupling piece when one of the coupling pieces disengages from another coupling piece. As another example, the sleeve 840 may be composed of a material which is flexible and when the predetermined force is applied the sleeve 840 may bend to allow coupling pieces to be disengaged from one another. Thus, the sleeve may return the coupling pieces to their original state position, as shown in FIG. 9 for example, subsequent to the coupling pieces being disengaged. The sleeve 840 may be composed of a plastic material similar to a shrink wrap, for example.

Figure 10:
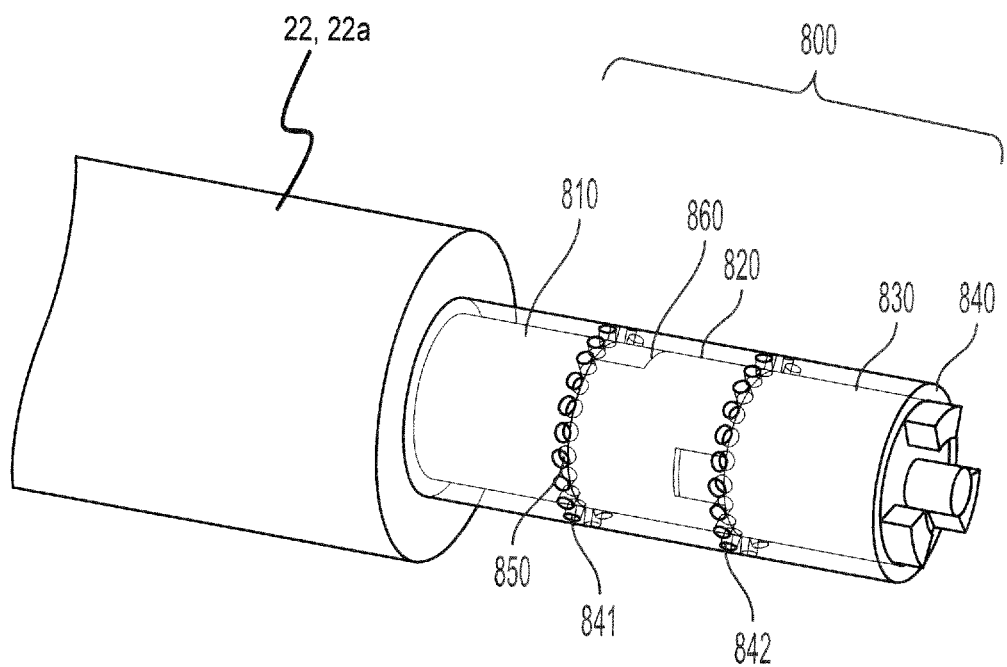

Referring to FIG. 10, the sleeve 840 may include perforations 841, 842 which are disposed circumferentially around the sleeve 840 at locations which correspond to an interface between coupling pieces. For example, perforations 841 are disposed at an interface between first and second coupling pieces 810, 820, and perforations 842 are disposed at an interface between second and third coupling pieces 820, 830. For example, the interface where the perforation is disposed may correspond to the joining of surfaces between the coupling pieces at a location or interface 850 other than a location or interface 860 where the tongue and groove of adjacent coupling pieces are joined together. The perforations 841, 842 may be disposed along an entire circumference of the sleeve 840 or partly along the circumference of the sleeve 840. The sleeve 840 may tear along the perforations 841, 842 when the predetermined force is applied to the coupling structure 800. The predetermined force may be the same as or different from (greater than) the predetermined force described with respect to the coupling structures 400 and 500. For example, the magnitude of the predetermined force corresponds to a force sufficient to overcome the strength of the material of the sleeve such that the sleeve actually tears along the perforations. For example, the sleeve 840 may tear along the perforations such that three separate pieces are formed. When the sleeve 840 tears along the perforations 841, 842 the sleeve 840 may be retained on the coupling structure 800 so that the sleeve 840 does not fall inside the image forming apparatus and potentially cause damage to internal components of the image forming apparatus.

In the example coupling structure 800 there are two perforations illustrated corresponding to the interfaces between adjacent coupling pieces. However, the disclosure is not so limited, and more than or less than two perforations may be disposed circumferentially about the sleeve. Also, the perforations may be disposed at the location corresponding to the interface 860 where the tongue and groove of adjacent coupling pieces join together.

Features of the coupling structures 400, 500 and coupling structure 800 may be combined in any combination thereof and are not mutually exclusive from one another. For example, a coupling structure may have surfaces composed of materials which have intrinsic features to provide or generate static friction between coupling pieces as discussed with respect to coupling structure 400, as well as protrusions and/or recesses as discussed with respect to coupling structure 500, and a sleeve 840 as discussed with respect to coupling structure 800. Other combinations of the coupling structures 400, 500, 800 are also possible.

As explained in the above examples, to achieve the proper alignment of the coupling structure of the developing roller, static friction and/or interference between surfaces of coupling pieces of the coupling structure may hold the coupling pieces together in a fixed orientation and position when subjected to small or minimal forces. When a larger force is applied, such as would occur when the development cartridge is alienated after installation of the development cartridge in the image forming apparatus, the coupling pieces are allowed to disengage or separate and function normally as a coupling.

Static friction between surfaces of the coupling pieces may be provided or generated by materials of the coupling pieces having a coefficient of friction to achieve the static friction needed to maintain positions of the coupling pieces during install and/or by lubricants which may offer additional positional support by affinity and shear forces. Structures illustrated in the examples may include rigid structures or flexible structures to hold the coupling structure in the aligned position when installing the development cartridge to the image forming apparatus. The coupling structure may include coupling pieces which are axially aligned with one another or are eccentric with one another. Protrusions and grooves may also be disposed on surfaces of the coupling pieces to keep the coupling pieces aligned with one another when installing the development cartridge to the image forming apparatus. As another example, a sleeve may circumferentially surround the coupling pieces to further keep the coupling structure in alignment and in a fixed position when installing the development cartridge to the image forming apparatus.

The coupling structures described herein may be applied in the context of a developing roller for a development cartridge to be installed in an image forming apparatus, for example, an image forming apparatus having multiple development cartridges such as that illustrated in FIG. 1. However, the disclosure is not so limited and the coupling structures described herein may also be applied in the context of a developing roller for a development cartridge to be installed in an image forming apparatus, for example, an image forming apparatus having a single development cartridge.

As set forth above in the described examples, an urging member such as a spring is not utilized or needed to keep the coupling pieces in the aligned state before or during installation of the development cartridge. Therefore, cost savings and a simplified structure may be achieved according to the above-described examples.

While this disclosure has been shown and described with reference to examples thereof, it will be understood by one of ordinary skill in the art that various changes in form and details may be made therein without departing from the spirit and scope as defined by the appended claims.

What is claimed is:

1. A developing roller for an image forming apparatus, comprising:
    a roller body; and
    a shaft to pass through a central axis of the roller body, an end part of the shaft including a coupling structure movable from a first position to a second position, the coupling structure including a first coupling piece, and a second coupling piece connected to the first coupling piece, and
    positions of the first coupling piece and the second coupling piece are maintained with respect to one another by a static frictional force between surfaces of the first coupling piece and the second coupling piece so as to hold the coupling structure in the first position, and
    when a predetermined force sufficient to overcome the static frictional force is applied to the coupling structure, the first coupling piece and the second coupling piece disengage from one another to allow the coupling structure to move from the first position to the second position.

2. The developing roller of claim 1, wherein
    the first coupling piece includes a protrusion, and
    the second coupling piece includes a recess to accommodate the protrusion and to generate an interference fit between surfaces of the protrusion and the recess so as to hold the coupling structure in the first position.

3. The developing roller of claim 1, further comprising a sleeve which circumferentially surrounds the coupling structure to maintain the positions of the first coupling piece and the second coupling piece with respect to one another such that the coupling structure is held in the first position, and
    when the predetermined force or a force greater than the predetermined force is applied to the coupling structure, the sleeve is to allow the first coupling piece and the second coupling piece to disengage from one another to allow the coupling structure to move from the first position to the second position.

4. The developing roller of claim 3, wherein
    the sleeve includes perforations disposed at least partly circumferentially around the sleeve at a position corresponding to an interface between the first coupling piece and the second coupling piece, and
    the sleeve is to tear along the perforations when the predetermined force or the force greater than the predetermined force is applied to the coupling structure.

5. The developing roller of claim 1, wherein
    the first coupling piece and/or the second coupling piece are composed of one or more materials to generate the static frictional force between surfaces of the first coupling piece and the second coupling piece.

6. The developing roller of claim 1, wherein a lubricant is disposed at an interface between the first coupling piece and the second coupling piece to generate the static frictional force between surfaces of the first coupling piece and the second coupling piece.

7. The developing roller of claim 6, wherein the lubricant is grease or a gel.

8. The developing roller of claim 1, wherein when the coupling structure is in the first position, the first coupling piece and the second coupling piece are arranged in a non-coaxial manner.

9. A development cartridge, comprising:
a photoconductor; and
a developing roller, to supply a printing material to the photoconductor, the developing roller including:
 a roller body, and
 a shaft to pass through a central axis of the roller body, an end part of the shaft including a coupling structure movable from a first position to a second position, the coupling structure including a first coupling piece, and a second coupling piece connected to the first coupling piece, and
 positions of the first coupling piece and the second coupling piece are maintained with respect to one another by a static frictional force between surfaces of the first coupling piece and the second coupling piece so as to hold the coupling structure in the first position, and
 when a predetermined force sufficient to overcome the static frictional force is applied to the coupling structure, the first coupling piece and the second coupling piece disengage from one another to allow the coupling structure to move from the first position to the second position.

10. The development cartridge of claim 9, wherein
the first coupling piece includes a protrusion, and
the second coupling piece includes a recess to accommodate the protrusion and to generate an interference fit between surfaces of the protrusion and the recess so as to hold the coupling structure in the first position.

11. The development cartridge of claim 9, wherein the developing roller further includes a sleeve which circumferentially surrounds the coupling structure to maintain positions of the first coupling piece and the second coupling piece with respect to one another such that the coupling structure is held in the first position, and
 when the predetermined force or a force greater than the predetermined force is applied to the coupling structure, the sleeve is to allow the first coupling piece and the second coupling piece to disengage from one another to allow the coupling structure to move from the first position to the second position.

12. The development cartridge of claim 11, wherein
the sleeve includes perforations disposed at least partly circumferentially around the sleeve at a position corresponding to an interface between the first coupling piece and the second coupling piece, and
the sleeve is to tear along the perforations when the predetermined force or the force greater than the predetermined force is applied to the coupling structure.

13. An image forming apparatus, comprising:
a main body; and
a development cartridge installable to the main body and detachable from the main body, the development cartridge including:
 a photoconductor, and
 a developing roller, to supply a printing material to the photoconductor, the developing roller including:
  a roller body, and
  a shaft to pass through a central axis of the roller body, an end part of the shaft including a coupling structure movable from a first position to a second position, the coupling structure including a first coupling piece, and a second coupling piece connected to the first coupling piece, and
 when the development cartridge is inserted into the main body during installation of the development cartridge to the main body, positions of the first coupling piece and the second coupling piece are maintained with respect to one another by a static frictional force between surfaces of the first coupling piece and the second coupling piece so as to hold the coupling structure in the first position, and
 when a predetermined force is applied to rotate the development cartridge within the main body after installation of the development cartridge to the main body, the static frictional force between surfaces of the first coupling piece and the second coupling piece is overcome such that the first coupling piece and the second coupling piece disengage from one another to allow the coupling structure to move from the first position to the second position.

14. The development cartridge of claim 13, wherein
the first coupling piece includes a protrusion, and
the second coupling piece includes a recess to accommodate the protrusion and to generate an interference fit between surfaces of the protrusion and the recess so as to hold the coupling structure in the first position.

15. The image forming apparatus of claim 13, wherein the developing roller further includes a sleeve which circumferentially surrounds the coupling structure to maintain positions of the first coupling piece and the second coupling piece with respect to one another such that the coupling structure is held in the first position, and
 when the predetermined force or a force greater than the predetermined force is applied to the coupling structure, the sleeve is to allow the first coupling piece and the second coupling piece to disengage from one another to allow the coupling structure to move from the first position to the second position.

* * * * *